United States Patent
Zellen et al.

(10) Patent No.: US 11,546,954 B2
(45) Date of Patent: *Jan. 3, 2023

(54) DEVICE AND VEHICLE PAIRING USING A NETWORK CONNECTION

(71) Applicant: Panasonic Automotive Systems Company of America, Division of Panasonic Corporation of North America, Peachtree City, GA (US)

(72) Inventors: Jeffrey Michael Zellen, Farmington Hills, MI (US); Matthew Bourdua, Peachtree City, GA (US); Janardhan Thodeti, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,737

(22) Filed: Dec. 31, 2020

(65) Prior Publication Data

US 2021/0127438 A1    Apr. 29, 2021

Related U.S. Application Data

(63) Continuation of application No. 16/505,818, filed on Jul. 9, 2019, now Pat. No. 10,912,135.

(60) Provisional application No. 62/711,877, filed on Jul. 30, 2018.

(51) Int. Cl.
H04B 7/00 (2006.01)
H04W 76/14 (2018.01)
H04W 4/80 (2018.01)
H04W 76/11 (2018.01)
G07C 5/00 (2006.01)

(52) U.S. Cl.
CPC ............ *H04W 76/14* (2018.02); *G07C 5/008* (2013.01); *H04W 4/80* (2018.02); *H04W 76/11* (2018.02)

(58) Field of Classification Search
None
See application file for complete search history.

(56) References Cited

U.S. PATENT DOCUMENTS

| | | | |
|---|---|---|---|
| 9,395,384 B1 * | 7/2016 | Dosher | G01S 19/49 |
| 10,412,088 B2 * | 9/2019 | Darnell | H04W 4/44 |

(Continued)

*Primary Examiner* — Gerald A Smarth
(74) *Attorney, Agent, or Firm* — Laurence S. Roach, Esq.

(57) ABSTRACT

A server device includes a memory and processor. A vehicle identification number (VIN) is stored in the memory. The VIN is associated with connection information for a vehicle associated with the VIN. The processor executes A VIN matcher stored in the memory, and denies a request for connection information in response to a mismatch between a supplied VIN from a connecting device and the VIN stored in memory. The processor executes a network connector stored in the memory, and sends connection information to a connecting device in response to a match between the supplied VIN from the connecting device and the VIN stored in memory. The connection information is sent through the network connection using a first communication protocol and contains information for the connecting device to connect to the vehicle through direct pairing using a second communication protocol.

20 Claims, 5 Drawing Sheets

(56) References Cited

U.S. PATENT DOCUMENTS

| | | | |
|---|---|---|---|
| 2004/0064221 A1* | 4/2004 | DePrez | G01D 21/00 |
| | | | 701/2 |
| 2016/0133063 A1* | 5/2016 | Lim | G07C 5/0825 |
| | | | 701/32.8 |
| 2018/0091930 A1* | 3/2018 | Jefferies | G07C 9/00571 |

* cited by examiner

DEVICE AND VEHICLE PAIRING USING A NETWORK CONNECTION

CROSS-REFERENCED TO RELATED APPLICATIONS

This application is a continuation of U.S. patent application Ser. No. 16/505,818, filed on Jul. 9, 2019, which is currently under allowance, which claims benefit of U.S. Provisional Application No. 62/711,877 filed on Jul. 30, 2018, which the disclosure of which are hereby incorporated by reference in their entirety for all purposes.

FIELD OF THE INVENTION

The present disclosure generally relates to a method, system, and device for paring a device and vehicle for direct communications using a separate network connection. More specifically, the present disclosure relates to providing communication connection information over a network connection that enables communication between two or more devices. In an example, the two devices can be a car and smartphone directly using a different communication protocol than the way the connection information was sent.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

Vehicles may include electronic components that interconnect with the vehicle itself as well as component systems such as navigation systems, audio systems, and media systems. A vehicle may include a networking component that can connect to the internet or other devices through direct pairing to the device based on commands initiated at both the device and the vehicle indicating they are ready to pair followed by a user action confirming that a particular pairing is approved.

SUMMARY

Generally, the techniques herein include a server device for pairing a connecting device and vehicle using a network connection. The server device can include a memory to store data and instructions, a processor, and a vehicle identification number (VIN) stored in the memory, where the VIN is associated with connection information for a vehicle associated with the VIN. The server device also includes a VIN matcher stored in the memory that when executed by the processor denies a request for connection information in response to a mismatch between a supplied VIN from a connecting device and the VIN stored in memory. The memory of the server device also includes a server device network connector stored in the memory that when executed by the processor sends the connection information to a connecting device in response to a match between the supplied VIN from the connecting device and the VIN stored in memory. In an example, the connection information is sent through a network connection. The network connection may use a first communication protocol. The connection information sent may contains information for the connecting device to connect to the vehicle. The connection information used to connect the device to the vehicle may use a second separate second communication protocol that doesn't use the network connection.

A method for pairing a device and vehicle using a network connection including identifying a vehicle identification number (VIN) and connection information, wherein the VIN stored in a memory device that links the VIN with the connection information. The method also includes attempting to match a supplied VIN from a connecting device with the VIN stored in the memory device. The method further includes sending the connection information to the connecting device in response to the supplied VIN matching the VIN stored in the memory device, wherein the connection information connects the connecting device to the vehicle without an intermediate processor between the connecting device and the vehicle.

The techniques disclosed herein further include a tangible, non-transitory, computer-readable medium comprising instructions that, when executed by a processor, pairs a device and a vehicle using a network connection. In an example, the instructions stored in the computer-readable medium can execute on a processor to store a vehicle identification number (VIN) and connection information in the computer-readable medium, wherein the memory device associates the VIN with the connection information and a request with the VIN returns the connection information. In an example, the instructions stored in the computer-readable medium can execute on a processor to attempt to match a supplied VIN from a connecting device through a network connection to the computer-readable medium, where the matching is attempted between the supplied VIN and the VIN stored in the computer-readable medium. In an example, the instructions stored in the computer-readable medium can execute on a processor to send the connection information to the connecting device in response to the supplied VIN matching the VIN stored in the computer-readable medium, wherein the connection information sent connects the connecting device to the vehicle without an intermediate server between the connecting device and the vehicle.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
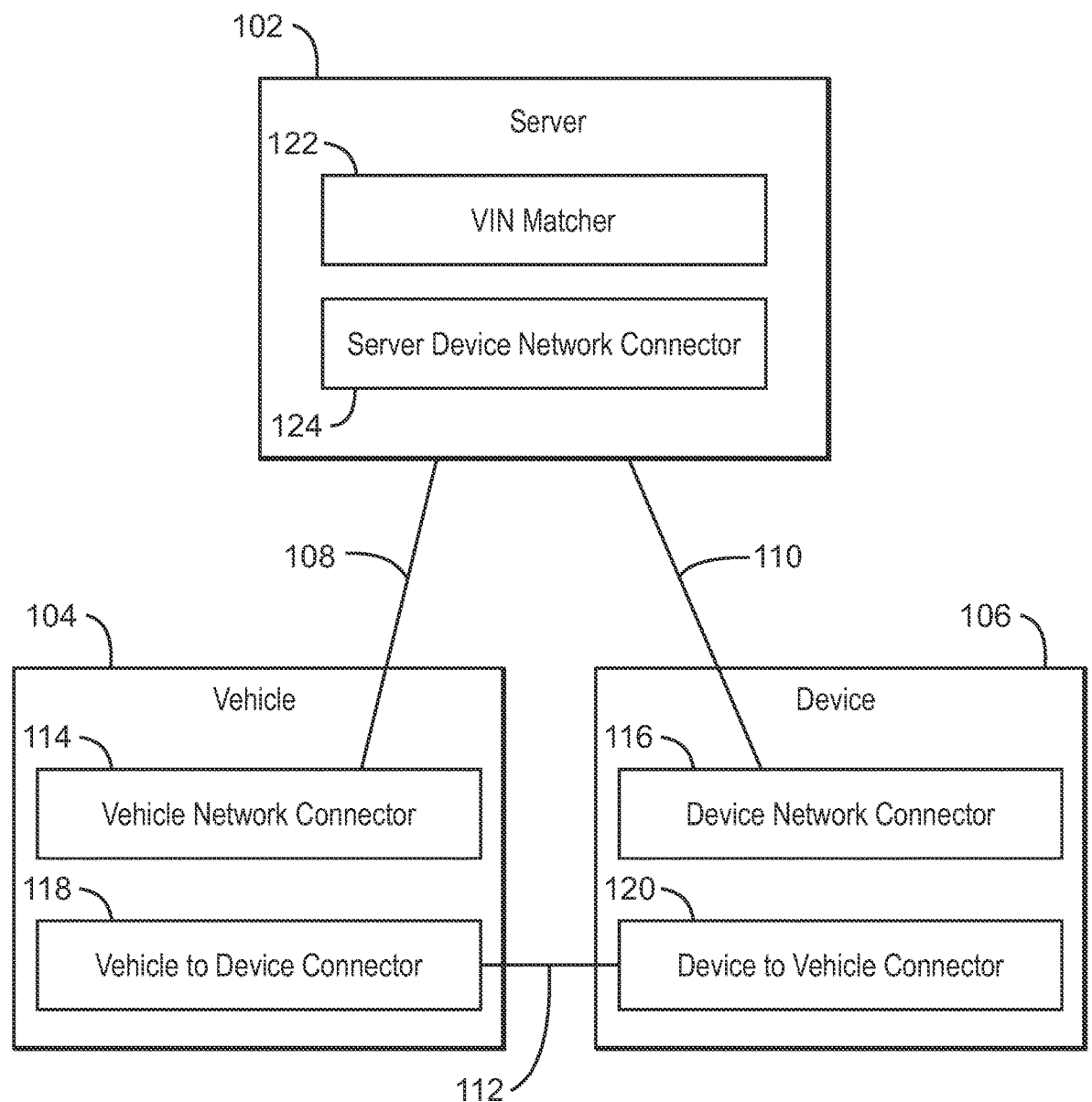
FIG. 1 is a block diagram of an example system for pairing a device and a vehicle using a network connection.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

The present disclosure describes a pairing of devices using data from a network connection. More specifically, several different variations are described herein where a vehicle is paired with a device using data from a first connection type or protocol, where the pairing communication once paired varies from the first connection type. In an example, the device and vehicle may pair initially negotiating secure connections through a direct WiFi connection or a cellular data network, such as a Long-Term Evolution (LTE) connection and then transition into only using Bluetooth. In the present disclosure, the information that provides the name of the vehicle access point is not manually input by a user but instead previously provided through a server to the connecting device. Thus a user may not need to take any action for the pairing of their device when actually getting in or approaching their vehicle even for the first time as the information has already be provided to their device through an internet connection. In an example, this connecting information, such as an access point SSID of the vehicle as well as an SSID authentication code can be associated in a server to the vehicle identification number (VIN) of the vehicle. Once a vehicle is purchased, the VIN may be input to the device and the connection information retrieved from the server device. Using this connection information, the connecting device may then access the vehicle and begin device-to-device pairing protocols through the connection enabled by the connection information. In an example, the connection information is provided to the device through network connection that is distinct from the protocol or communication style used for the pairing of the device to the vehicle. A pairing of devices may involve communication with no intermediate processor, server, or network, while the network connection may include an intermediate server, processor, storage, or network. Accordingly, the initial set up of a vehicle to device pairing may be considered out-of-band from the final pairing configuration. Further and more complete details are outlined in the Figures below.

FIG. 1 is a block diagram of an example system 100 for pairing a device and a vehicle using a network connection. The lines used to connect various components do not necessary connect to the exact component through electrical leads, but instead are shown here to indicate a general pathway and flow of communication.

The example system can include a server 102 that enables pairing between a vehicle 104 and a device 106. As used herein, the server 102 may be a hardware device remotely located from both the vehicle and the device. The server 102 may include digital storage space and an organizational system that can store a large amount of information about the vehicle 104 or a plurality of vehicles. The vehicle 104 may connect to the server 102 using a vehicle-to-server network connection 108. The vehicle may provide information about the vehicle to the server 102. The server 102 may connect to the device using a server-to-device network connection 108. In an example, both network connections include a server between the two communicating devices. The timing of the communication between the vehicle 104, server 102, and device 106 can vary based on a number of circumstances. In an example, the vehicle provides a vehicle identification number (VIN) as well as access point information to a wireless component installed on the vehicle. The providing of a VIN and access point information to the server through the vehicle-to-server network connection 108 can occur at the time of installation of the access point into the vehicle 104. The server to device network connection 110 can provide the access point information in response to the device 106 providing a VIN that matches to access point information stored in the server 102.

In an example, the device 106 may provide a VIN in response to the device 106 being within a threshold distance of the vehicle. Other examples include the device 106 providing a VIN in response to start-up of the device, in response to a user action, or when a user, manufacturer, or other vehicle seller provides the VIN information or other corresponding information to the device 104 upon purchase of the vehicle.

Once a device has received the connecting information from the server 102, the device may then attempt pairing communications 112 with the vehicle 104 directly. As used herein the term pairing refers to a direct device to device communication without an intermediate server, relay, router, switch, base station of cellular communications, processor, or other hardware device. In an example, the pairing communications 112 are established following a handshake protocol for secure communications that follow known standards of pairing communications. Pairing communications 112 can be through Bluetooth, Wi-Fi, or other device to device communications.

In an example, the server 102 may provide the device 106 with information about the access point name of the vehicle 104. The device 106 may then initiate pairing communications 112 by initiating an access request using WiFi and the access point provided through the server to device network connection 110. In this way, the initial access to the vehicle may be considered obtained through an out-of-band communication. The pairing communications 112 may use a different protocol than the network communications from which the device 106 received the information for initiating the pairing communications. In an example, while an access point for the vehicle 104 may be provided to the device 106 over a server to device network connection 110 following an a cellular data network protocols, such as LTE cellular communications protocols, the pairing communications may be initiated following WiFi protocols.

The vehicle 104 can include a vehicle network connector 114. The device 106 can include a device network connector. The vehicle network connector 114 and the device network connector 116 can be network interface controllers for wireless communications with the server 102. Each of the vehicle network connector 114 and the device network connector 116 can be a network interface card, network adapter, or physical network interface. The vehicle network connector 114 and device network connector 116 are located in the vehicle 104 and the device 106, respectively, and can each include a network controller that implements the electronic circuitry required to communicate using a specific physical layer and data link layer standard such as Wi-Fi or a cellular data network, such as LTE. The vehicle network connector 114 may communicate with the server 102 through the vehicle-to-server network connection 108 as described herein. The device network connector 116 may communicate with the server 102 through the server to device network connection 110 as described herein.

The vehicle 104 can include a vehicle to device connector 118 and the device 106 can include a device to vehicle connector 120. The device 106 can include a device to vehicle connector 120. The vehicle to device connector 118 and the device to vehicle connector 120 can be pairing hardware that communicate directly with one another. In an example, pairing communications 112 can be initiated between the vehicle to device connector 118 and the device to vehicle connector 120. In an example, the vehicle to device connector 118 and the device to vehicle connector 120 may follow a Bluetooth protocol for establishing secure communications including a handshake sequence. In an example, the handshake sequence can be negotiated per Bluetooth out of band protocols following 802.11 standards using a mutually authenticated transport security layer between the vehicle 104 and the device 106.

The server 102 can orchestrate the exchange of connection information. The vehicle 104 may provide information to a server 102 indicating how a device 106 may initiate communication with the vehicle 104. In an example, the vehicle 104 may provide information about the digital address and access credential for the vehicle to device connector 112 to the server along with a VIN identifying the vehicle. The server 102 may store the VIN of a vehicle or a number of vehicles as well as their associated connection information. The server 102 may provide the connection information to a device 106 either through a push of this information or in response to a request for the connection information from the device 106. In an example, the device 106 may supply a VIN to the server 102. The server 102 may include a VIN matcher 122 to attempt to match the supplied VIN to a VIN stored in the server 102. If a VIN matcher 122 identifies a matching VIN in the server 102, then the server device network connector 124 may transmit the connection information associated with the supplied VIN to the device 106. Based on the connection information, the device 106 may initiate communications with the vehicle 104 specifically through pairing communications 112 as described herein.

Figure 2:
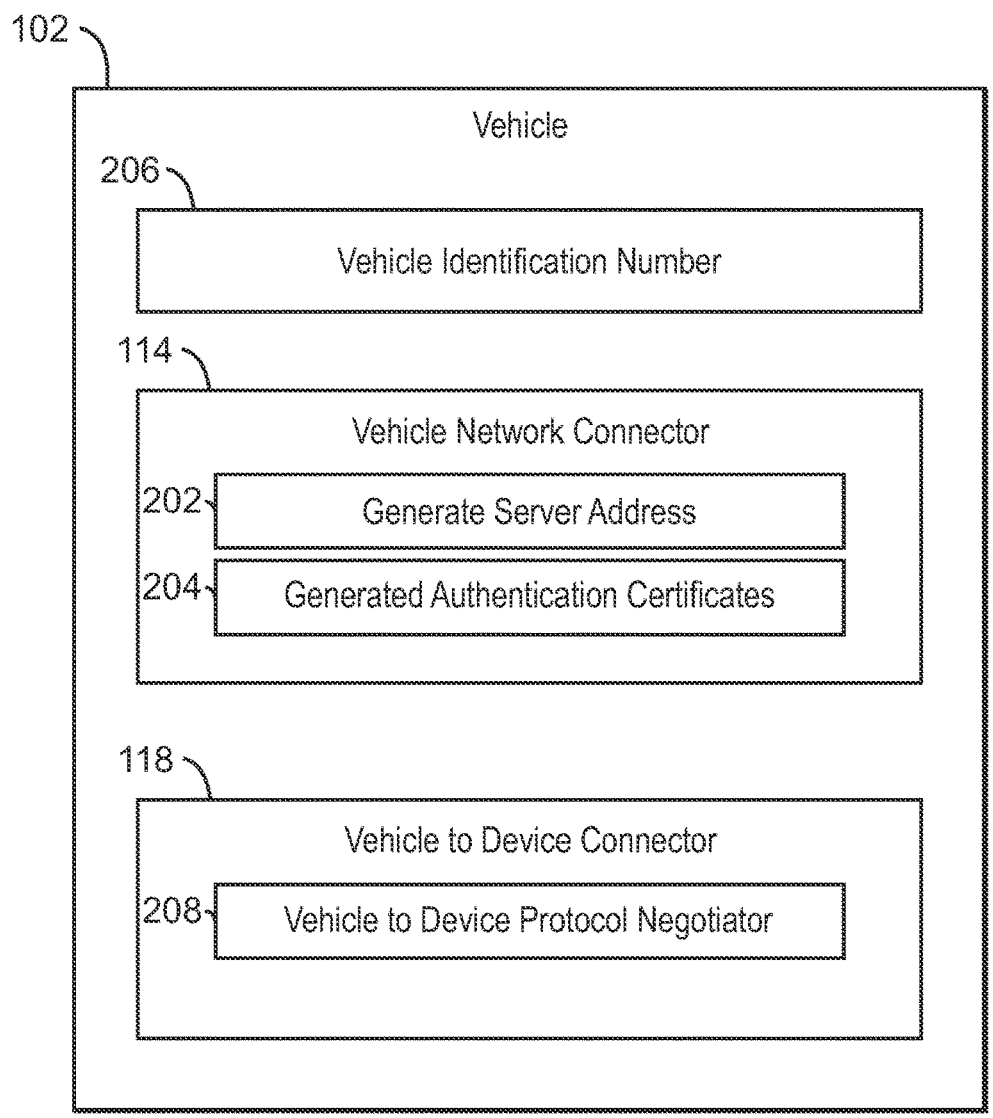
FIG. 2 is a block diagram of an example vehicle in a system for pairing a device and a vehicle using a network connection.

FIG. 2 is a block diagram of an example vehicle in a system for pairing a device and a vehicle using a network connection. Like numbered items are as described with respect to FIG. 1.

The vehicle network connector 114 may be a separate component installed in the vehicle 104 during manufacturing or assembly of the vehicle 104. The vehicle network connector may include a generated server address 202. As used herein, the generated server address 202 may include using built in a cellular data network modem, such as an LTE modem following the standards of LTE communication. In an example, the generated server address 202 may also be any other identifier to allow pairing communications with the vehicle 104. As disclosed herein, pairing communications refer to communications that do not go through a central network or server and are device to device such as an ID generated as the name of a WiFi access point following the standards of WiFi protocol. Accordingly, the providing of the generated server address 202 from the vehicle to a server is to enable pairing communications directly with the vehicle 104 from a device.

The vehicle network connector 114 can also include a generated authentication certificate 204. This authentication certificate may be used to gain access to the vehicle to device connector 118 by validating the device attempting access is authorized to communicate with the vehicle. The vehicle network connector 114 may communicate the generated server address 202, the generated authentication certificate 204, and the vehicle identification number (VIN) 206 to a server. When sending the generated server address 202, the generated authentication certificate 204, and the VIN 206 to a server all at once, the VIN 206 may be associated with the generated server address 202 and the generated authentication certificate 204 such that these elements are stored in a look-up table, associative array, or other storage configuration where a request using a VIN 206 can find and retrieve the generated server address 202 and the generated authentication certificate 204.

The vehicle to device connector 118 can include a vehicle to device protocol negotiator 210. Once a device has a generated server address 202 and the generated authentication certificate 204, the device may attempt to access the vehicle 104 wirelessly by contacting the vehicle to device connector 118. The vehicle to device protocol negotiator 210 may handle the establishment of a secure connection following an established digital communication protocol. In an example, the vehicle to device protocol negotiator 210 may follow the pairing protocol for Bluetooth secure communications between devices. In an example, the Vehicle to Device Connector 118 may use a WiFi access point of the vehicle for direct communications initiated by the device. In circumstances where the vehicle is using the WiFi Access point, then the Vehicle to Device connector may provide an SSID and SSID authentication key for validation with the personal device.

In an example, negotiation through a vehicle to device protocol negotiator 210 can include negotiating a Bluetooth out of band connection following the IEEE 802.11 standard using mutually authenticated transport layer security. In various alternatives, the negotiation of a vehicle to device protocol negotiator 210 can use Secure Bluetooth (BT) Classic Out of Band (OOB) pairing protocols, Secure Bluetooth Low Energy (BLE) OOB Pairing protocols, Legacy BLE OOB pairing, or any other suitable device to device protocols. In one example, following one protocol, the vehicle to device protocol negotiator 208 can provide through pairing communications a Bluetooth media access control (MAC) address, Mrand, 128-bit temporary key (TK), and a pairing response command. The vehicle to device protocol negotiator 210 can also receive and store from a device the device's own Bluetooth MAC address, Srand, 128 bit TK, and a pairing request command. Using the received information, the vehicle to device protocol negotiator 210 may calculate Mconfirm, provide Mconfirm back to the device, and receive a calculated Sconfirm from the device while calculating a vehicle Sconfirm value and attempting to match the received Sconfirm from the device as well as the calculated Sconfirm in the vehicle. In response to a value match between the received and calculated Sconfirm values, the vehicle to device protocol negotiator 210 may complete the pairing for secure communication between the device and the vehicle.

In another example, a vehicle and device may authenticate each other prior to being within pairing communication range. When the device is a further physical distance from the pairing communications with the vehicle, the vehicle to device protocol negotiator 210 may also attempt to authorize and validate pairing communications through a network communication path. In this example, the vehicle to device protocol negotiator 210 may provide and receive validation and credentials through a server. In this example, the vehicle to device protocol negotiator 210 may provide through the network communications a Bluetooth media access control (MAC) address, Mrand, 128-bit temporary key (TK), and a pairing response command to enable later authenticated and secure pairing when the device enters a threshold physical proximity enabling pairing communications.

The vehicle to device protocol negotiator 210 can also receive and store from a device communicating, through the network connection, the device's own Bluetooth MAC address, Srand, 128 bit TK, and a pairing request command. Using the received information, the vehicle to device protocol negotiator 210 may calculate Mconfirm, provide Mconfirm back to the device through the network communications with a server, and receive a calculated Sconfirm from the device through the network communications with a server. The vehicle to device protocol negotiator 201 may further calculate a vehicle Sconfirm value and attempt to match the received Sconfirm from the device and the calculated Sconfirm in the vehicle. In response to a value match between the received and calculated Sconfirm values, the vehicle to device protocol negotiator 210 may complete the authorization for pairing for secure communication between the device and the vehicle that will become active when the device enters a physical proximity that enables pairing communication. The above values and names of protocol negotiation may vary based on the protocol used.

Figure 3:
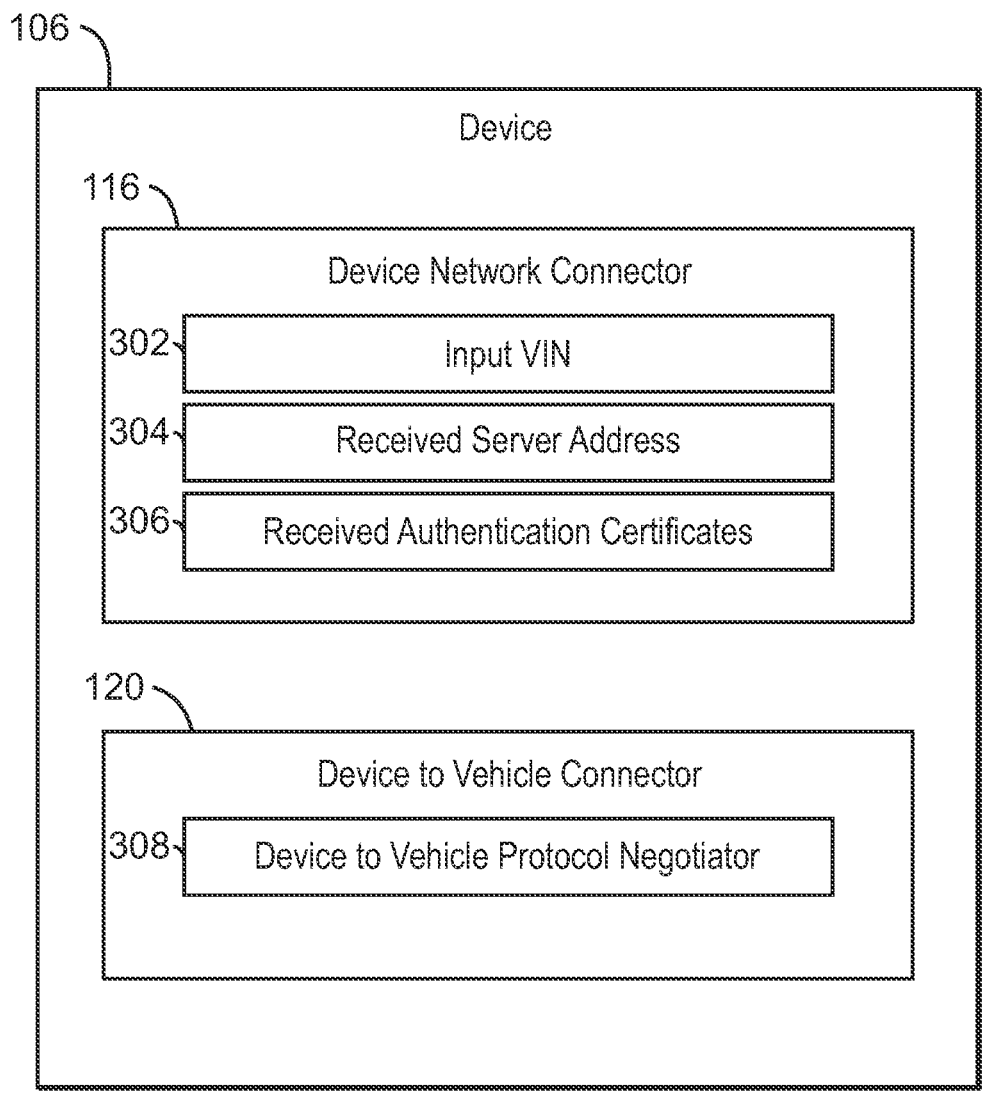
FIG. 3 is a block diagram of an example device in a system for pairing a device and a vehicle using a network connection.

FIG. 3 is a block diagram of an example device in a system for pairing a device and a vehicle using a network connection. Like numbered items are as described with respect to FIG. 1.

The device network connector 116 may receive and/or store an input VIN 302. In an example, the input VIN 302 may be input by a user or provided through another device through email, electronic communications, digital photograph with scanned and detected numbering in the photograph, transmitted through near field communications (NFC), or other suitable means of a VIN being input to a device 106. The device network connector 116 may also include a received server address 304 and a received authentication certificates 306 for communications through a cellular data network, such as LTE. Both the received server address 304 and the received authentication certificates 306 can be received through network connections. In an example, the input VIN 302 may be provided to a server through network communications and the server address 304 and authentication certificates 306 may be received by the device network connector in response to a match of VIN at the server. While this figure shows communication of a server address through cellular data network communication protocols, such as LTE, other communication protocols are possible including WiFi.

The device to vehicle connector 120 may include a device to vehicle protocol negotiator to use the received server address 304 and the received authentication certificates 306 to access a vehicle through pairing communications. As discussed herein, pairing communications may avoid digital, wired, electronic, or other similar communications through a network, router, switch or other intermediate hardware between the device 106 and the vehicle. The device to vehicle protocol negotiator 308 may access a vehicle access point using the received server address 304 and the received authentication certificates 306 in order to initiate and negotiate further pairing communications through a WiFi, Bluetooth, or other protocol that may differ from the protocol used for the network communications with a server. In an example, the Device to Vehicle Connector 120 may use a WiFi access point of the vehicle for direct communications initiated by the device 106. In circumstances where the vehicle is using the WiFi Access Point, then the Device to vehicle connector 120 may use a received SSID and received SSID authentication key for validation with the vehicle.

In an example, the device to vehicle protocol negotiator 308 may use a collected server address and access credentials from the server through a cellular data network communications, such as LTE communications, in response to an input VIN 302. The device to vehicle protocol negotiator 308 may then connect to the vehicle using the WiFi SSID and WiFi. Through this WiFi connection, the device to vehicle protocol negotiator 308 may negotiate a Bluetooth out-of-band secure connection following IEEE 802.11 standards using mutually authenticated transport layer security. The device to vehicle protocol negotiator 308 may provide to the vehicle, a device Bluetooth MAC Address, Srand, a 128-bit Temporary Key (TK), and a Pairing Request Command. The device to vehicle protocol negotiator 308 may receive and process from the vehicle, a BT MAC Address, a 128-bit TK, a Pairing Response Command, and Mrand. Using the received information from the vehicle, the device to vehicle protocol negotiator 308 may calculate Sconfirm. The device to vehicle protocol negotiator 308 may receive Mconfirm from the vehicle and separately calculate Mconfirm and use this calculated value to confirm a value match with the received Mconfirm. The device to vehicle protocol negotiator 308 may also provide Sconfirm to the vehicle in order to allow confirmation by the vehicle. In an example, if the received Mconfirm and the calculated Mconfirm values match, then the device to vehicle protocol negotiator 308 may confirm secure pairing communications with the vehicle. This process as discussed for both the vehicle and the device follow one example of a secure pairing communication protocol, however other pairing protocols are contemplated that make use of access information received or learned over a network communication separate from the pairing communications. In various alternatives, the negotiation of a device to vehicle protocol negotiator 308 can use Secure Bluetooth (BT) Classic Out of Band (OOB) pairing protocols, Secure Bluetooth Low Energy (BLE) OOB Pairing protocols, Legacy BLE OOB pairing, or any other suitable device to device protocols.

In another example, a vehicle and device may authenticate each other for pairing communication prior to being within pairing communication range. When the device 106 is a further physical distance from the pairing communications with the vehicle, the device to vehicle protocol negotiator 308 may also attempt to authorize and validate pairing communications through a network communication path. In this example, the device to vehicle protocol negotiator 308 may provide to the vehicle, a device Bluetooth MAC Address, Srand, a 128-bit Temporary Key (TK), and a Pairing Request Command through network communications and a server. The device to vehicle protocol negotiator 308 may receive from the network communications, a BT MAC Address, a 128-bit TK, a Pairing Response Command, and Mrand originating from the vehicle. Using the received information from network communications from the vehicle, the device to vehicle protocol negotiator 308 may calculate Sconfirm. The device to vehicle protocol negotiator 308 may receive Mconfirm from the vehicle through the server and network communications and then separately calculate Mconfirm and use this calculated value to confirm a value match with the received Mconfirm. The device to vehicle protocol negotiator 308 may also provide Sconfirm to the vehicle through the server in order to allow confirmation by the vehicle. In an example, if the received Mconfirm and the calculated Mconfirm values match, then the device to vehicle protocol negotiator 308 may confirm secure pairing communications with the vehicle. In response to a value match between the received and calculated Sconfirm values, the device to vehicle protocol negotiator 308 may complete the authorization for pairing for secure communication between the device and the vehicle that will become active when the device enters a physical proximity that enables pairing communication.

Figure 4:
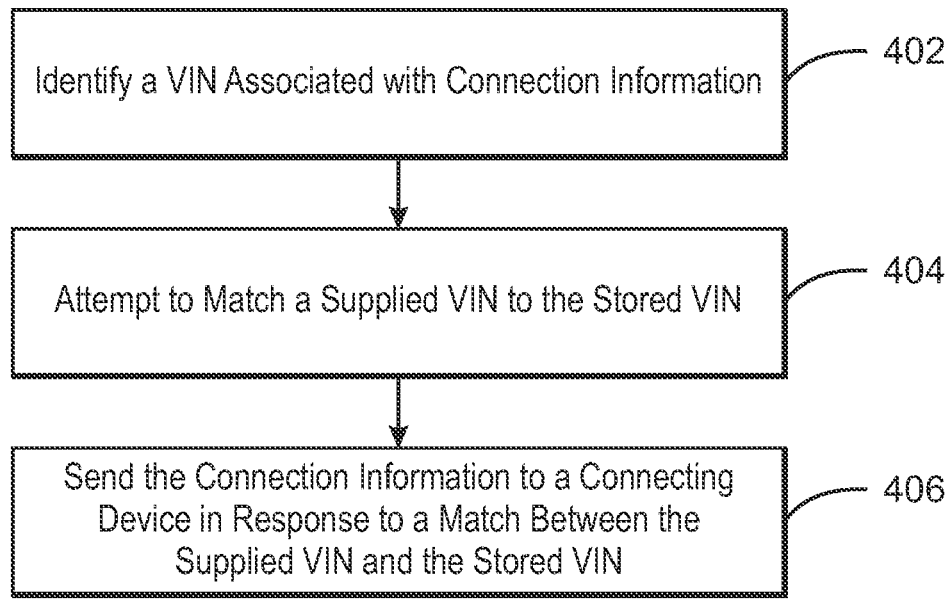
FIG. 4 is a process flow diagram of an example method for pairing a device and a vehicle using a network connection.

FIG. 4 is a process flow diagram of an example method 400 for pairing a device and a vehicle using a network connection. At block 402, a server may identify a vehicle identification number (VIN) and connection information, wherein the VIN stored in a memory device that links the VIN with the connection information. As used herein the VIN may be composed of 17 characters digits and letters that act as a unique identifier for the vehicle. In another example, the VIN may be a written or digital indicator of a unique vehicle. While the term 'number' is in the acronym, any type of character or identifier that can be stored and manipulated by a computer system may be used. The identified VIN and connection information may have been sent to the server, received by the server, scanned and located in a file system by a processor in the server. The identification of a VIN can include a receipt of a digital file from a manufacturer of the vehicle. In an example, the connection information is a service set identifier (SSID) and an SSID authentication key for a communication hardware installed in the vehicle.

A network adaptor may be a hardware device to enable internet or other wireless communications, where the adaptor may be associated with a specific ID and password. In an example, the SSID and SSID authentication key may be linked to the VIN at a vehicle manufacturer or vehicle assembly location. The network adaptor or other wireless communication device may digitally connect to a vehicle information hardware device in order to provide and receive information identifying the vehicle as well as providing the computers of the vehicle the SSID and SSID authentication key. In an example, the connection information follows the Institute of Electrical and Electronics Engineers (IEEE) 802.11 communication standard. This can include the device and vehicle communicating with one another directly using the IEEE 802.11 standard. In an example, this can include initial secure connections being established using the standardized four-way handshake between an access point and a wireless client. In an example, the device can be the wireless client and the vehicle can act as the access point. In an example, the device can act as the access point and the vehicle can act as the wireless client.

In an example, the connection information follows Long-Term Evolution (LTE), where the term 'Long Term Evolution' a registered trademark owned by the European Telecommunications Standards Institute for the wireless data communications technology. In example, the connection information follows Bluetooth communication protocol, where the term 'Bluetooth' is a registered trademark maintained by Bluetooth Special Interest Group. As used herein, Bluetooth is a wireless technology standard for exchanging data over short distances using short-wavelength radio waves in the radio band from 2.4 to 2.485 GHz from fixed and mobile devices, and building personal area networks (PANs).

At block 404, there is an attempt to match a supplied VIN from a connecting device with the VIN stored in the memory device. In an example, the connecting device is a smartphone, tablet, smart watch, headset, augmented reality device, headset wearable, keychain car starter, credit card, radio frequency ID (RFID) chip, or any other suitable hardware that a user may commonly carry with them or bring into the vehicle with them. The supplied VIN can be supplied from an application on operating on the connecting device. In an example, the supplied VIN can be supplied from an application with a manufacturer authorization which can be done through a separately credentialed service, can be set up by the manufacturer upon the time of purchase by a user. In an example, the supplied VIN can be provided to a server device in response to a user inputting the VIN, a key, or both.

At block 406, the connection information is sent to the connecting device in response to the supplied VIN matching the VIN stored in the memory device, wherein the connection information connects the connecting device to the vehicle without an intermediate processor between the connecting device and the vehicle. In an example, the connection information can be sent in response to an additional detection that the connecting device is within the vehicle, within a certain proximity of the vehicle, within 10 feet of the outside of the vehicle, within a distance that a communication signal from the vehicle can reach the connecting device, within a distance that both the communicating device and the vehicle can exchange information, or any other suitable distance.

In an example, the VIN stored in the memory and the connection information is removed from the memory in response to a threshold number of VIN matches have been identified. In an example, after one, two, five, ten, or more matches have been identified and the connection information sent to the devices, no further matches may be permitted. In an example, the VIN stored in the memory and the connection information is removed from the memory in response to the elapsing of a threshold time duration since the original storing of the VIN number and connection information in the memory. In an example, the time duration can be a week, a month, 30 days, or a year since the original storing of the VIN number and connection information in the memory of a server device.

Figure 5:
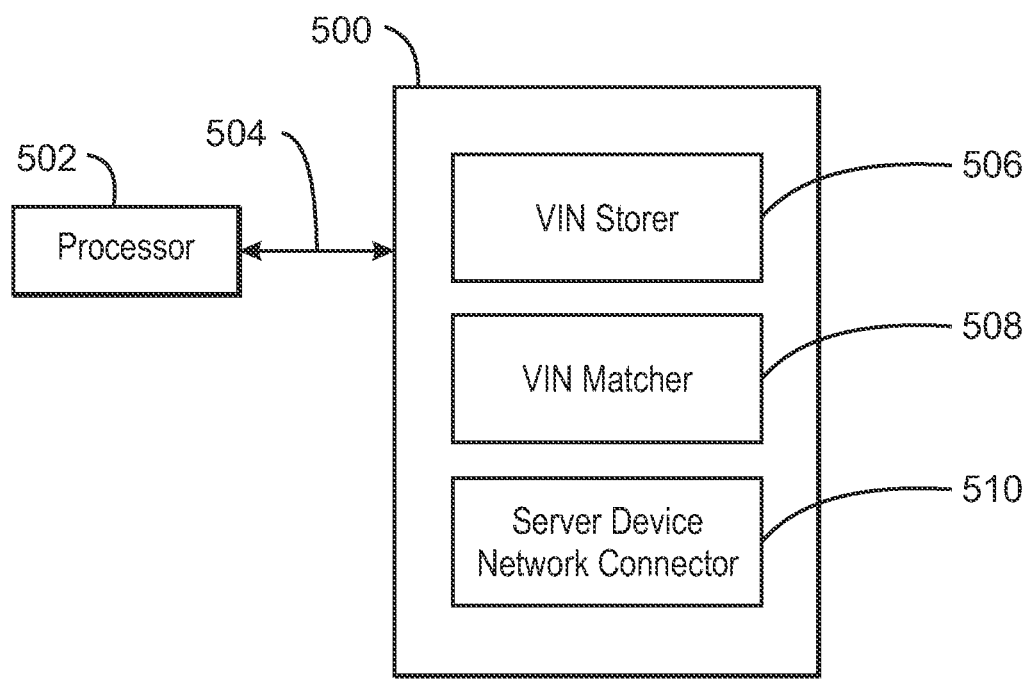
FIG. 5 is a block diagram of an example computer-readable medium storing instructions, that when executed on a processor pairs a device and a vehicle using a network connection.

FIG. 5 is a block diagram of an example computer-readable medium 500 storing instructions, that when executed on a processor pairs a device and a vehicle using a network connection. The tangible, non-transitory, computer-readable medium 500 includes instructions that, when executed by a processor 502 can direct the processor 502 through a bus 504 to pair a device and a vehicle using a network connection.

The computer-readable medium 500 includes instructions that when executed on a processor employ a VIN storer 506 to store a vehicle identification number (VIN) and connection information in the computer-readable medium 500, wherein the memory device associates the VIN with the connection information and a request with the VIN returns the connection information.

The computer-readable medium 500 can include a VIN matcher 508 to attempt to match a supplied VIN from a connecting device through a network connection to the computer-readable medium 500, where the matching is attempted between the supplied VIN and the VIN stored in the computer-readable medium 500. In an example, the connection information is a service set identifier (SSID) and an SSID authentication key. In an example, the connection information follows IEEE 802.11 communication standards, Long-Term Evolution (LTE) communication standards, or Bluetooth communication protocol as discussed above.

The computer-readable medium 500 can include a server device network connector 510 to send the connection information to the connecting device in response to the supplied VIN matching the VIN stored in the computer-readable medium 500. In an example, the connection information sent connects the connecting device to the vehicle without an intermediate server between the connecting device and the vehicle. In an example the computer-readable medium 500 can act to remove the VIN stored in the memory and the connection information from the memory in response to a threshold number of VIN matches have been identified. The VIN stored in the memory and the connection information can also be removed from the memory in response to the elapsing of a threshold time duration since the original storing of the VIN number and connection information in the memory. In an example, the connecting device is a smartphone, tablet, smart watch, headset, augmented reality device, headset wearable, keychain car starter, credit card, radio frequency ID (RFID) chip, or any other suitable hardware that a user may commonly carry with them or bring into the vehicle with them.

What is claimed is:

1. A server device for pairing a connecting device and vehicle using a network connection, comprising:
    a memory to store data and instructions;
    a processor;
    a vehicle identification number (VIN) stored in the memory, where the VIN is associated with connection information for a vehicle associated with the VIN;
    a server device network connector stored in the memory that when executed by the processor sends the connection information to the connecting device in response to a match between a supplied VIN from the connecting device and the VIN stored in memory, the connection information sent through the network connection using a first communication protocol and containing information for the connecting device to connect to the vehicle through a direct pairing using a second communication protocol.

2. The server device of claim 1, wherein the first communication protocol and the second communication protocol are distinct protocols from one another.

3. The server device of claim 1, wherein the VIN is stored in the memory in response to VIN being provided to the server device.

4. The server device of claim 1, wherein the connection information enables the connecting device to begin device to device pairing protocols with the vehicle associated with the VIN in response to receipt by the server device of the VIN.

5. The server device of claim 1, wherein the VIN stored in the memory and the connection information is removed from the memory in response to a threshold number of VIN matches have been identified.

6. The server device of claim 1, wherein the VIN stored in the memory and the connection information is removed from the memory in response to an elapsing of a threshold time duration since an initial storing of the VIN and the connection information in the memory.

7. The server device of claim 1, wherein the connection information is a service set identifier (SSID) and an SSID authentication key.

8. A method for pairing a connecting device and vehicle using a network connection comprising:
    identifying a vehicle identification number (VIN) and connection information for a vehicle associated with the VIN, wherein the VIN is stored in a memory device that links the VIN with the connection information;
    attempting to match a supplied VIN from the connecting device with the VIN stored in the memory device; and
    sending the connection information to the connecting device in response to the supplied VIN matching the VIN stored in the memory device, the connection information being sent through the network connection using a first communication protocol and containing information for the connecting device to connect to the vehicle through a direct pairing using a second communication protocol.

9. The method of claim 8, wherein the connection information is sent to the connecting device with information for pairing to the vehicle using the second communication protocol distinct from the first communication protocol.

10. The method of claim 8, wherein the VIN is stored in the memory device in response to VIN being provided to a server device.

11. The method of claim 8, wherein the connection information enables the connecting device to begin device to device pairing protocols with the vehicle in response to receipt by a server device of the VIN.

12. The method of claim 8, wherein the VIN stored in the memory device and the connection information is removed from the memory device in response to a threshold number of VIN matches have been identified.

13. The method of claim 8, wherein the VIN stored in the memory device and the connection information is removed from the memory device in response to an elapsing of a threshold time duration since an original storing of the VIN and the connection information in the memory device.

14. The method of claim 8, wherein the connection information is a service set identifier (SSID) and an SSID authentication key.

15. A server device for pairing a connecting device and vehicle using a network connection, comprising:
    a memory to store data and instructions;
    a processor;
    a vehicle identification number (VIN) stored in the memory, where the VIN is associated with connection information for a vehicle associated with the VIN;
    a VIN matcher stored in the memory that when executed by the processor denies a request for the connection information in response to a mismatch between a supplied VIN from the connecting device and the VIN stored in memory; and
    a server device network connector stored in the memory that when executed by the processor sends the connection information to the connecting device in response to a match between the supplied VIN from the connecting device and the VIN stored in memory, the connection information being sent through the network connection using a first communication protocol and containing information for the connecting device to connect to the vehicle through a direct pairing using a second communication protocol.

16. The server device of claim 15, wherein the first communication protocol carrying the connection information and the second communication protocol for the connection between the server device and the vehicle are distinct protocols from one another.

17. The server device of claim 15, wherein the VIN is stored in the memory in response to VIN being provided to the server device.

18. The server device of claim 15, wherein the connection information enables the connecting device to begin device to device pairing protocols with the vehicle associated with the VIN in response to receipt by the server device of the VIN.

19. The server device of claim 15, wherein the VIN stored in the memory and the connection information is removed from the memory in response to a threshold number of VIN matches have been identified.

20. The server device of claim 15, wherein the VIN stored in the memory and the connection information is removed from the memory in response to the elapsing of a threshold time duration since an original storing of the VIN and connection information in the memory.

* * * * *